Oct. 15, 1957  W. T. SWINEHART ET AL  2,809,794
FLIGHT-COORDINATING SYSTEM FOR AIRCRAFT
Filed Nov. 1, 1954  2 Sheets-Sheet 1
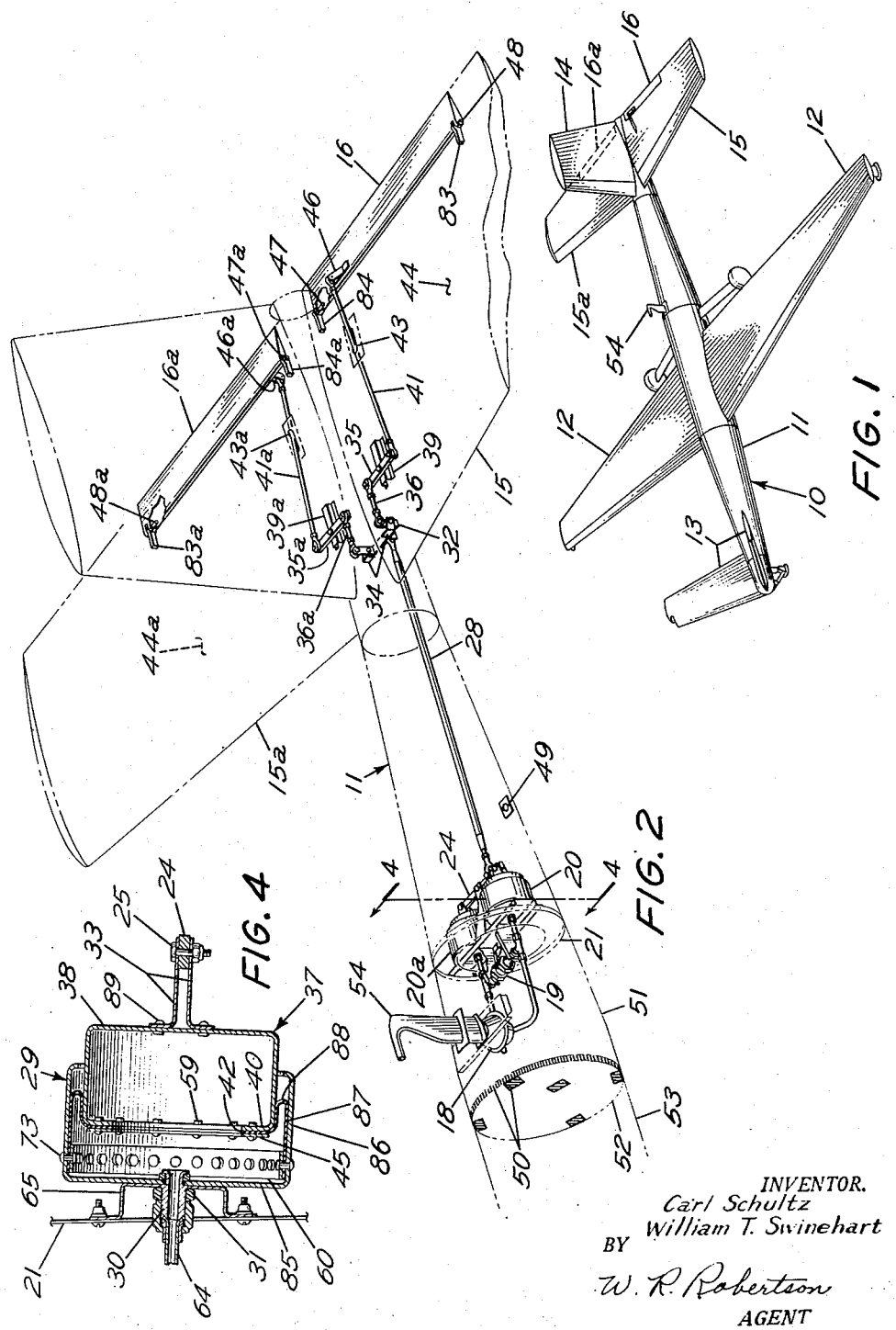
INVENTOR.
Carl Schultz
William T. Swinehart
BY
W. R. Robertson
AGENT Oct. 15, 1957  W. T. SWINEHART ET AL  2,809,794
FLIGHT-COORDINATING SYSTEM FOR AIRCRAFT
Filed Nov. 1, 1954  2 Sheets-Sheet 2

INVENTOR.
Carl Schultz
William T. Swinehart
BY
W. R. Robertson
AGENT

United States Patent Office 2,809,794
Patented Oct. 15, 1957

2,809,794

FLIGHT-COORDINATING SYSTEM FOR AIRCRAFT

William T. Swinehart and Carl Schultz, Dallas, Tex., assignors to Chance Vought Aircraft, Incorporated, Dallas, Tex., a corporation of Delaware Application November 1, 1954, Serial No. 465,848

5 Claims. (Cl. 244—80)

This invention relates to automatic flight-coordinating means for aircraft and the like and more specifically to such a means which utilizes the movements of a spherical body in response to gravitational and centrifugal forces, exerted alike in the spherical body and on the aircraft in which said body is installed, to govern a motive power for deflecting control surfaces of the aircraft for obtaining coordinated flight of the aircraft.

By way of general description, the invention comprises a roll- and turn-sensing means, an energizing means, a power means, and a connecting means. The combined function of these means is to maintain the vehicle in which the invention is installed in coordinated flight, the term "coordinated flight" being herein consistently employed to designate a flight condition wherein the aircraft's lateral axis is normal to the resultant of gravitational and centrifugal forces acting on the aircraft, which condition is existent when in straight flight the aircraft's wings are horizontally level, and also existent when in turning flight the aircraft's wings are properly banked. The energizing means, which may be a pump, blower, or the like, or which may use ram air taken from the atmosphere during flight, supplies air under pressure to the power means, which air constitutes the source of energy utilized for actuation of the power means. Linked by the connecting means to control surfaces of the aircraft, the power means may be utilized for direct actuation of those surfaces. The sensing means, interposed in air lines connecting the energizing means to the power means, bleeds off a variable flow of air upstream of the power means, and thus limits and controls the air pressure available to the power means. During coordinated flight, air thus bled from these air supply lines enters a chamber of the sensing means in two oppositely directed streams of nominally equal cross-sectional area and velocity, impinges upon diametrically opposite areas of a ball contained within the chamber, and escapes through vent holes in the chamber walls. Striking upon diametrically opposite areas of the ball, the two air streams tend to hold the ball in a particular neutral position of equilibrium within the chamber. The ball may be moved in varying degrees from this neutral position by gravitational forces imposed upon the ball as a result of out-of-trim rolling motions of the aircraft, and by centrifugal and gravitational forces imposed upon the ball during turns of the aircraft. While the aircraft is in coordinated flight, no gravitational or centrifugal forces tend to roll the ball from its neutral position in the chamber of the sensing means, and the sensing means maintains energization of the power means in such balance as to cause the control surfaces to remain in a position wherein they impose on the aircraft no forces which tend to roll the aircraft on its longitudinal axis. In out-of-trim rolls and turns of the aircraft, gravitational and centrifugal forces displace the ball from its neutral position, the amount and direction of displacement being proportional to the degree of variation from coordinated flight. This displacement of the ball reduces the flow of air bled from a selected one of the air supply lines upstream of the power means, the selection of a particular line being in accordance with the direction of deviation from coordinated flight; and, as a consequence, air pressure delivered to the power means energizes the power means to cause deflection of the control surfaces in an amount proportional to the deviation, the direction of deflection being such that aerodynamic forces imposed upon the surfaces exert rolling forces on the aircraft that return the aircraft to a coordinated flight attitude.

A principal object of this invention is to provide an apparatus operable for actuation of a movable control surface or surfaces whose function is to impose on an aircraft moments of force which tend to roll the aircraft on its longitudinal axis.

Another object is to provide an apparatus of this character which, in fully automatic fashion, senses turning as well as out-of-trim rolling motions of the aircraft in which it may be installed and responds to these motions by actuation of a movable control surface or surfaces whose function is to impose on the aircraft moments of force tending to produce a corrective roll of the aircraft on its longitudinal axis, the manner of this actuation of the surfaces by the apparatus being such that the aircraft is constantly maintained in a substantially zero-bank, transversely level attitude during straight flight, and in a bank of substantially perfect degree during turning flight.

An additional object is to provide an apparatus which is operable for actuation of the above-mentioned movable control surface or surfaces and which, in fully automatic fashion, senses coordinated turning as well as straight flight and responds thereto by maintaining said surface or surfaces in such position as is conducive to continued coordinated flight of the aicraft.

A further object of this invention is to provide an apparatus, operable for actuation of a movable control surface or surfaces whose function is that of imposing rolling forces on an aircraft, in which pressurized air is the source of power utilized by the apparatus for actuation of the control surface or surfaces for positioning the aircraft in a wings-level attitude in straight flight and in a bank of proper degree during turns.

Still another object of this invention is to provide an apparatus of the character thus far stated which has means for accumulating and for allocation of the pressurized air usable by the apparatus as a power source.

A still further object is to provide an apparatus of the character thus far described which, being made of a comparatively small number of parts, all of which parts are easily and simply constructed, effects a great reduction in the cost and complexity generally characterizing previous installations for similar automatic control of aircraft movable surfaces whose function is to impose on an aircraft moments of force tending to roll the aircraft on its longitudinal axis.

Other objects and advantages will be apparent from the specification and claims, and from the accompanying drawings which illustrate an embodiment of the invention.

In the accompanying drawings, in which like numerals are employed throughout for the purpose of designating like parts, Fig. 1 is a perspective view of an aircraft to which one form of the present invention has been applied, showing an external component of that invention;

Fig. 2 is a perspective view of the middle and aft portions of the aircraft showing the principal components of the invention;

Fig. 4 is a median vertical section through a pneumatic actuator of the invention, taken as shown on line 4—4 of Fig. 2.

Figure 5:
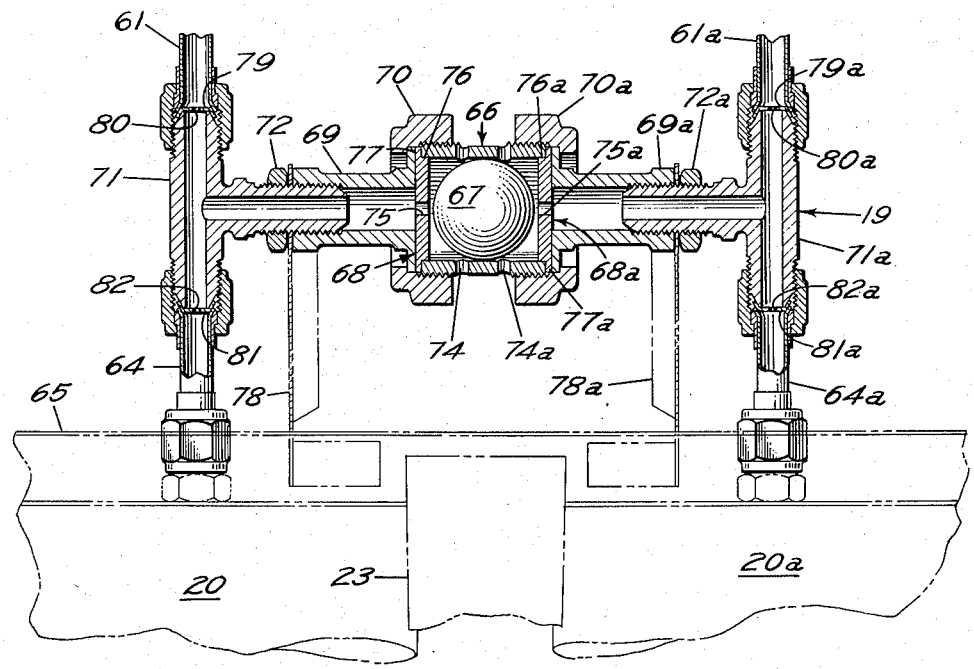
Fig. 5 is a horizontal median sectional view of the sensing unit of the invention with portions of the pneumatic actuator and tubing included in the invention.

Referring to the drawings, with particular reference to Fig. 1, there is shown, by way of example, a towed target 10, being a glider-type aircraft designed to be towed behind a powered aircraft and to serve as an aerial target while being so towed, which has a fuselage 11 to which are pivotally attached two mock wings 12 and to which are rigidly attached two nose vanes 13, a vertical tail surface 14, and two horizontal tail surfaces 15, 15A. Serving an aerodynamic function wherein they contribute in flight to the lifting forces supporting the towed target, the forward nose vanes also contain and serve as fairings for tow posts and tow rope attachment means not shown. The vertical and horizontal tail surfaces, which are rigidly attached to the aft end of the fuselage at their respective inboard ends, are of a construction which is common and well known, and is therefore not herein described. The term "mock wings" is used in its generic significance to include wings of the sort which contribute nothing to the lifting forces which in flight support the fuselage to which they are attached. The mock wings are pivotally attached to the fuselage of the towed target, are free-floating so that they bear no aerodynamic load beyond their own weight, and are provided on the towed target solely to improve the target's simulation of a conventional-type winged aircraft. Thus, it will be understood that the lifting forces which sustain the target glider in flight are principally contributed by the nose vanes and the horizontal tail surfaces. Such a target glider as is described above is more fully set forth in patent application Serial Number 365,132, filed June 30, 1953, now abandoned, and owned by the same assignee as the present application.

A left-hand aileron 16 is mounted on the left-hand horizontal tail surface 15, and a right-hand aileron 16A is mounted on the right-hand horizontal tail surface 15A. The ailerons are mounted on the horizontal tail surfaces, rather than, as is more usual, on the wings, because the free-floating wings can normally impart no rolling moments to the fuselage, whereas such rolling moments are readily transmitted from the ailerons through the rigidly mounted horizontal tail surfaces into the fuselage for roll stabilization of the aircraft. The ailerons are employed to trim the aircraft to a substantially wings-level attitude in straight flight, to roll the aircraft to a proper degree of bank in any given turn, and to return the aircraft to a proper attitude when out-of-trim rolling moments to which the towed target may be subjected, such as rolling moments imparted by gusts, have caused the target to roll on its longitudinal axis away from the attitude proper to its existing condition of straight or turning flight. An air scoop 54 receives ram air from the airstream and delivers the ram air to cooperating sensing and actuating means, presently to be described, which cause the ailerons to be deflected as required for accomplishment of the above-enumerated aileron functions.

Figure 3:
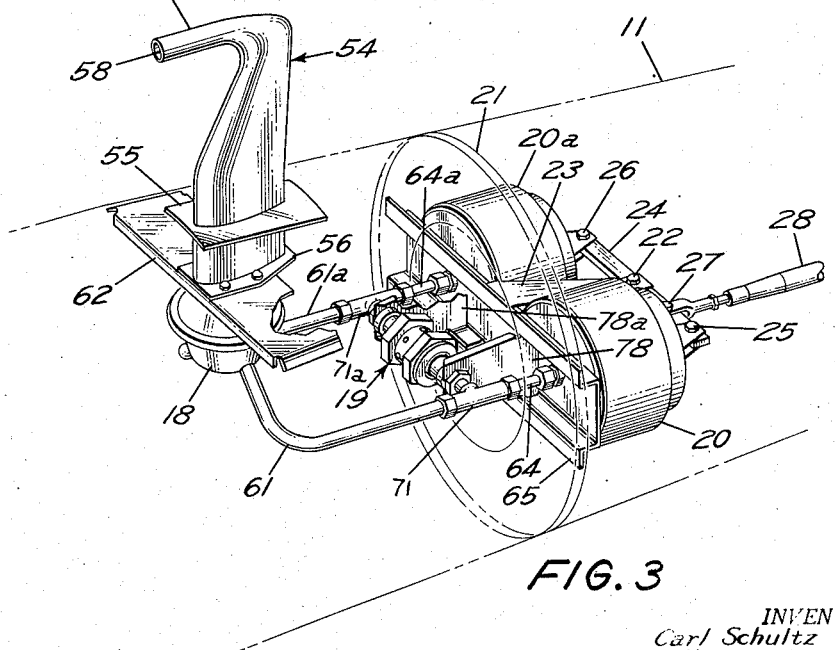
Fig. 3 is an enlarged perspective view of the aircraft's midsection showing with greater clarity and detail the pneumatic-type components of the invention.

In Fig. 2 are shown the air scoop 54 and a plenum chamber 18 of the energizing means, a roll- and turn-sensing unit 19 of the sensing means, a left-hand actuator 20, right-hand actuator 20A, and lever 24 of the power means, and components including forward pushrod 28 of the connecting means. Referring for the moment to Fig. 3, in which figure connections existing between the lever 24 and the actuators 20, 20A and forward pushrod 28 are shown in detail, the lever 24 is pivotally connected by the bolt 25 to the aft end of the left-hand actuator 20, pivotally connected by bolt 26 to the aft end of the right-hand actuator 20A, and pivotally mounted at its mid-section by bolt 22 on the bracket 23, which bracket is rigidly attached to fixed fuselage structure by means of the support member 65. Pivotally connected to the lever 24 by the bolt 27 is the forward pushrod 28. With reference again to Fig. 2, the means by which the lever 24 of the power means is connected to the ailerons 16, 16A will be described. From its connection with the lever 24, the forward pushrod 28 of the connecting means extends aft to its connection with a yoke 32. The respective constructions of the pushrod 28 and yoke 32, together with the four pushrods 36, 36A, 41, 41A and two walking beams 35, 35A to be mentioned hereinafter, also the pivotal attachments of the yoke and walking beams to their respective support means and to the several pushrods, are of types which are usual and well known, and therefore are not herein described in detail. The yoke 32 is pivotally mounted on the support fittings 34 rigidly attached to fixed structure of the fuselage 11. Two intermediate pushrods 36, 36A are connected at their respective forward ends to the yoke 32 and at their aft ends to the respective inboard ends of the walking beams 35, 35A, which beams are pivotally mounted on the beam support members 39, 39A, which members are in turn rigidly attached to fixed structure of the horizontal tail surfaces 15, 15A. The aft pushrod 41, connected to the outboard end of the left-hand walking beam 35, extends aft and upward through a clearance hole 43 in the horizontal tail surface upper skin 44 to its connection with the horn 46 rigidly mounted on the left-hand aileron 16. The aft pushrod 41A similarly is connected to the right-hand walking beam, extends aft and downward from that beam through a clearance hole 43A in the right-hand horizontal tail surface lower skin 44A, and is connected to a horn 46A rigidly mounted on the right-hand aileron 16A.

The ailerons are of a common, well-known construction, being rounded at their thicker leading edges and tapered to their thinner trailing edges, and are conventionally mounted on the horizontal tail surfaces so that, in the neutral position, the trailing edge of each aileron is preferably flush with the trailing edge of the horizontal tail surface on which it is mounted, while the aileron upper and lower surfaces are flush and in the same plane with the corresponding upper and lower surfaces of the tail surface. Being thus in their neutral position smoothly aligned with and having the same contour as the corresponding trailing edge portions of the horizontal tail surfaces on which they are mounted, the ailerons, in their neutral position, do not substantially effect the total aerodynamic lifting forces produced by the horizontal tail surfaces except to the extent that actually continuous trailing edge structure filling the areas occupied by the ailerons would affect the total of such forces. Each aileron has an arm of the sort commonly termed a "horn" 46 or 46A which is rigidly affixed to the aileron near the inboard end of its trailing edge. Near its leading edge, the left-hand aileron 16 is pivotally attached by the bolts 47, 48 to the support fittings 83, 84, which fittings are in turn rigidly attached to fixed structure (not shown) of the horizontal tail surface 15. The point at which the left-hand aileron horn 46 connects to the aft pushrod 41 lies above and forward of the left-hand aileron pivot bolts 47, 48. The point at which the right-hand aileron horn 46A is connected to the aft pushrod 41A lies below and forward of the bolts 47A, 48A by means of which the right-hand aileron is pivotally attached to the support fittings 83A, 84A, which fittings are rigidly mounted on fixed structure (not shown) of the right-hand horizontal tail surface 15A.

While complete explanation of the means whereby the pneumatic actuators 20, 20A are caused to expand and to contract is made in later paragraphs, it may presently be stated that such expansion and contraction is accomplished, as required for roll stabilization and for proper banking of the aircraft in turns, by means of ram air supplied through the air scoop 54, plenum chamber 18, sensing unit 19, and connecting tubing. Expansion of the left-hand actuator 20 and simultaneous collapse of the right-hand actuator 20A results in an aft movement of the point 27 at which, as shown in Fig. 3, the lever 24 is connected to the forward pushrod 28. Collapse of the left-hand actuator 20 and expansion of the right-hand actuator 20A results in forward motion of the connection point 27. Operation of the connecting means, or control linkage, with resulting deflections of the ailerons and consequent effects on flight attitude of the towed target, will now be considered.

When the left-hand actuator 20 is expanded and the right-hand actuator 20A is simultaneously collapsed, the left-hand aileron is deflected downward and the right-hand aileron is deflected upward from its neutral position; upwardly directed aerodynamic forces imposed upon the left-hand aileron are transmitted through the aileron attachment points into the left-hand horizontal tail surface and through that surface into the fuselage at the left-hand horizontal tail surface attachment points; downwardly directed aerodynamic forces imposed upon the right-hand aileron are similarly transmitted into the fuselage at the right-hand horizontal tail surface attachment points; and the resulting torque imposed upon the fuselage rolls the airframe to the right at a rate, other roll-producing factors being constant, proportional to the amplitude of aileron deflection. When the two ailerons, shown in Fig. 2 to be connected at their horns 46 or 46A by the control linkage components 28, 32, 35, 35A, 36, 36A, 41, 41A to the lever 24, are in their neutral position, the lever 24 is in its neutral position wherein its longer axis preferably lies normal to the longitudinal axis of the aircraft. When the actuators 20, 20A move this lever 24 so that its connection point 27 to the forward pushrod 28 moves aft, the resulting aft motion of the forward pushrod 28 moves the yoke 32 aft at its point of connection to the forward pushrod, and forward at its points of connection to the intermediate pushrods 36, 36A. The resulting forward motion of the intermediate pushrods, transmitted to the walking beams 35, 35A, causes those beams to move in a forward direction at their points of connection to the intermediate pushrods, and to move aft at their connection points to the aft pushrods 41, 41A. Aft motion of the two aft pushrods moves the two aileron horns 46, 46A aft at their connections to the aft pushrods. As the connection point of the left-hand aileron horn 46 to the aft pushrod 41 lies above the left-hand aileron pivot bolts 47, 48, aft movement of the horn 46 results in downward deflection of the aileron 16. The connection point of the aft pushrod 41A to the right-hand aileron horn 46A lies below the right-hand aileron pivot bolts 47A, 48A; consequently, aft motion of the aileron horn 46A results in upward deflection of the right-hand aileron 16A.

When the left-hand pneumatic actuator is collapsed and the right-hand actuator is simultaneously expanded, the left-hand aileron is deflected upward and the right-hand aileron is deflected downward from their neutral positions by motions of the lever 24, control linkage components 28, 32, 35, 35A, 36, 36A, 41, 41A, and aileron horns 46, 46A, which motions are in directions opposite to those described above in connection with downward deflection of the left-hand and upward deflection of the right-hand ailerons; and the torque transmitted into the airframe as a result of aerodynamic forces imposed upon the ailerons rolls the aircraft to the left on its longitudinal axis.

In addition to the above-described items, Fig. 2 shows an exhaust air vent 49 and sealing provisions 50. For efficient operation of the roll-sensitive unit 19, ram air must flow at a certain minimum rate through connecting tubes from the plenum chamber 18 to the sensing unit 19 and through that unit into the fuselage compartment 51 in which the sensing unit is located. To maintain this rate of air flow, a certain pressure differential must be maintained between ram air supplied to the sensing unit 19 and air in the compartment 51, the compartment's air being at the lower pressure. This pressure differential could be lowered by accumulation within the compartment 51 of the ram air bled through the roll-sensitive unit 19 into that compartment. As the fuselage, forward of the bulkhead 52 dividing the compartment 51 from the forward compartment 53, is not necessarily constructed in an entirely airtight manner, ram air could conceivably enter the fuselage in a forward area, pass from the forward compartment 53 through any apertures existing in the bulkhead 52 into the compartment 51, and thus, by raising the air pressure within that compartment, lower the pressure differential noted above as necessary for efficient operation of the sensing unit 19. To maintain this required pressure differential, an exhaust air vent 49, which is an aperture communicating between the interior of the compartment 51 and the air outside the fuselage, is provided to permit passage overboard of air bled into the compartment 51 by the sensing unit 19; and apertures in and around the bulkhead 52 are stopped by the sealing provisions 50, thus making that bulkhead impenetrable to air in the fuselage forward compartment 53. The sealing provisions 50 may include calking, sealing tape, rubber gaskets, or other well-known sealing means, and therefore are not herein described in detail.

In connection with Fig. 3, a description will be given of the energizing means, and preliminary descriptions will be given of the power means and sensing means. In regard to the energizing means, the air scoop 54 is rigidly attached to the fuselage 11 by means of the air scoop upper mounting plate 55 and is further rigidly attached at its lower mounting plate 56 to the upper surface of the plenum chamber support fitting 62. The scoop, of tubular construction throughout its length, projects upwardly from the fuselage to a point sufficiently removed from the airframe to consistently encounter smooth air free from turbulence occasioned by passage of the airframe through the air. At this point, the scoop bends at approximately 90 degrees to form a forwardly-directed portion 57. Ram air entering from the airstream into an orifice 58 in the forwardly-directed portion 57 passes through the length of the tubular scoop, continues through an opening in the plenum chamber support fitting 62, and enters the plenum chamber 18.

The plenum chamber 18 is of a conventional spherical form, is rigidly affixed to the fuselage 11 by means of the support fitting 62, contains a standard screen not shown, and has in its bottom a small drain hole not shown. Welded to the plenum chamber's lower surface and opening into that chamber at points symmetrically located on each side of the centerline of the plenum chamber which lies parallel to the longitudinal centerline of the aircraft, and also located the same distance aft of the plenum chamber's forwardmost edge, are two substantially identical tubes 61, 61A which receive ram air from the plenum chamber 18. Within the plenum chamber 18, solid foreign materials are removed from the ram air by the screen internal to the chamber, and water deposited within the chamber from the air is drained from the chamber through the drain hole. Besides thus acting as an air cleaner, the plenum chamber 18 damps and smooths turbulence which might characterize the ram air entering the chamber from the air scoop 57, and serves as a reservoir of pressurized air. Although some air is continually lost through the drain hole (not shown), the amount of this loss is generally constant and is too small to have a detrimental effect on the operation of the roll-stabilizing system.

From the tubes 61, 61A, ram air flows into two T fittings 71, 71A, and from these two T fittings into two identical tubes 64, 64A attached at their forward ends to the aft arms of the T fittings 71, 71A. Through the two tubes 64, 64A, air flows into the two actuators 20, 20A, to which the tubes 64, 64A are attached at their aft ends. The two T fittings 71, 71A have inboard arms which are connected to the two opposite ends of the sensing unit 19, through which, as will be described, air is bled from the T fittings 71, 71A into the compartment 51 in which the sensing unit is installed. It should here be noted that the sensing unit 19 is rigidly mounted on two brackets 78, 78A rigidly attached to the actuator support member 65, which member is in turn rigidly attached to fixed structure of the fuselage. The sensing unit 19 lies with its longer axis level in reference to the airframe and perpendicular to the airframe's longitudinal centerline.

All connections between the several ram-air conducting and utilizing units described above are, of course, made in an airtight manner.

The power means of the present example, of which a detailed description will now be given, makes use of the economical source of power afforded by ram air taken from the airstream. The two substantially identical pneumatic actuators 20, 20A are rigidly attached at their forward, stationary ends to the fuselage bulkhead 21 by means of their support member 65, and their aft ends, which are movable in a forward and aft direction, are attached as previously described to the lever 24. Movement of the aft end of a particular actuator 20 or 20A occurs in response to an air pressure differential which may be caused, as will be described, to exist between the air within and without the particular actuator. As the lever 24 pivots near its middle on the pin 22, the two actuators, one attached as described to each of the lever's two ends, can move only in a reciprocating fashion wherein one actuator must be collapsed as the other actuator expands. Referring now to Figure 4, the left-hand actuator 20 has an outer member 29 with a cylindrical portion 86 open at its aft end and closed at its forward end by an end portion 85. This forward end portion 85 is provided with an air fitting 30 connected to the tube 64 leading, as previously described, from the sensing unit's T fitting 71 to the actuator 20. The air inlet fitting 30 passes through an opening in the support member 65 by means of which the actuators 20, 20A are rigidly attached to the fuselage bulkhead 21. A nut 31 compresses the support member 65 against the outer member 29, thus firmly attaching the outer member to the support fitting. Supported by the lever 24, to which it is pivotally attached by means of the pivot bolt 25 and the pair of brackets 33, an inner member 37 extends through a part of its length into the outer member's cylindrical portion 86, and has a closed aft end portion 38, also a forward end portion 40 with an opening 42 communicating between the interiors of the inner and outer members. Fasteners 89, installed in an airtight manner, are used to attach the brackets 33 to the inner member's closed aft end portion 38. Being of somewhat smaller diameter than the outer member, the inner member is freely movable in a reciprocating fashion relative to the outer member. A tubular, flexible diaphragm 87 with a slack portion 88 is attached in airtight fashion at its one end to the inner member's forward end portion 40 by means of the retainer 45 and fasteners 59, and at its other end, by means of the collar 60 and fasteners 73, to the outer member cylindrical portion 86 near the end portion 85. The diaphragm 87 thus effects a flexible seal between the inner and outer members 37 and 29 and renders escape of air from the actuator 20 impossible except through the air fitting 30. When pressurized air is admitted into the outer and inner members 29 and 37 through the tube 64, air fitting 30, and opening 42, the increased air pressure within those members tends to cause the inner member to move aft, thus moving the lever 24, to which the inner member's pair of brackets 33 are attached by pin 25, in the same direction. Coincidently with this aftward motion of the inner member, which amounts to an expansion of the pneumatic actuator 20, the flexible diaphragm 87 straightens through a portion of its slack portion 88 and so conforms to the changed spatial relationship of the inner member 37 to the outer member 29. When air is permitted to escape through the air fitting 30 and tube 64 until air pressures inside and outside the actuator 20 are equal, and if the tube 64 in effect remains unstopped so that air may be freely vented from the actuator 20, the actuator offers substantially no resistance to collapsing forces which may be applied to it by the lever 24. When such collapse is effected, the inner member 37 moves forward within the outer member 29, and the flexible diaphragm 87 again conforms to the new spatial relationship existing between the inner and outer members.

Referring again to Fig. 3, equal air pressure supplied to the interiors of the actuators 20, 20A causes each actuator to push in the same aft direction against the lever 24 with the same force. As the points where the bolts 25, 26 connect the actuators 20, 20A to the lever 24 are equidistant from the lever pivot bolt 22, no motion of the lever or of either actuator occurs as a result of forces exerted by the actuators, which, when their respective internal air pressures are equal, stand in equilibrium. It follows that, with no turning forces exerted on the lever other than by the actuators, the actuators can move the lever only when one actuator's internal air pressure exceeds that of the other actuator, thus creating a greater expansive force within the one actuator and a lesser force within the other; and it further follows that in expanding, thus pushing aft its connection with the lever, an actuator must overcome such expansive forces as exist in the other actuator and must actively compress that other actuator through the same distance through which it itself expands. The expanding actuator must at the same time overcome any reverse forces transmitted from the ailerons through the control linkage, which reverse forces, engendered by aerodynamic forces imposed upon the ailerons when deflected, tend to return the ailerons, hence the lever and actuators, to their respective neutral positions, in which these reverse forces generally become zero.

Thus, when the lever 24 is at rest, three forces are in equilibrium: the expansive force of one actuator, the expansive force of the other actuator, and a reverse force (which is generally zero when the ailerons are in their neutral position) exerted by the control linkage. By increasing the expansive force of the one or the other actuator, this equilibrium may be disturbed, thus effecting aileron deflection for banking and correcting out-of-trim rolling motions of the aircraft. For understanding of the discussion which follows of the manner in which turning and out-of-trim rolling motions are sensed and pressures within the two actuators are controlled, it will be helpful to note that expansion of the left-hand actuator 20 results in compression of the right-hand actuator, aft motion of the forward pushrod 28, downward deflection of the left-hand aileron, upward deflection of the right-hand aileron, and application to the fuselage of a torque tending to roll the fuselage to the right; and that expansion of the right-hand actuator results in the reverse of these conditions.

The sensing means will now be described in detail. Referring to Fig. 5, the sensing unit 19 senses whether or not the aircraft is flying in a properly banked attitude in turns, and in straight flight senses the position of the aircraft relative to a desired wings-level, zero-bank attitude. In response to any deviation from coordinated flight, the sensing unit 19 selectively bleeds off the ram air supply to an appropriate actuator and permits ram air to pass to the other actuator, thus causing the actuators to deflect the ailerons in the direction and amount required for rotation of the aircraft on its longitudinal axis to a coordinated-flight attitude. As the aircraft reaches a proper flight attitude, the sensing unit progressively changes the air pressures supplied to the actuators in a manner wherein aerodynamic forces tending to return the ailerons to their neutral position come into balance with the actuator's expansive forces when the ailerons, moved by those aerodynamic forces, reach the position required for maintaining the aircraft in that attitude. Deviations from a wings-level attitude in straight flight, as well as deviations from a proper degree of bank at the beginning and during the course of turns, are responded to quickly; consequently, out-of-trim rolling motions are checked and corrected with a promptness sufficient to maintain the aircraft in flight in a manner substantially free of perceptible out-of-trim rolling motions and improper degree of bank.

The sensing unit 19 comprises a cylindrical chamber 66, a ball 67, two end plates 68, 68A, and two end fittings 69, 69A with nuts 70, 70A. Two T fittings 71, 71A with nuts 72, 72A, two upstream restrictors 79, 79A, and two downstream restrictors 81, 81A are connected to the end fittings 69, 69A, the T fitting 71 being connected to the end fitting 69, and the T fitting 71A to the end fitting 69A. The chamber 66 is closely machined to a uniform inside diameter well free of irregularities. The chamber's wall is pierced by a plurality of aligned, radially-drilled vent holes 74 equally spaced about the chamber's periphery and all spaced the same equal distance from one end of the chamber, and is further pierced by a similar second row of an equal number of vent holes 74A also equally spaced about the chamber's periphery and all spaced an equal distance from the other end of the chamber, this distance being the same as that of the first row from the first end. The vent holes 74 and 74A are all of the same size. Each end of the cylinder is threaded with a male thread.

The two ends of the chamber 66 are closed respectively by the end plates 68, 68A. Each end plate is pierced in its center by an orifice 75 or 75A of one size common to the two orifices. The peripheries of the plates are shaped into closely machined step portions 76, 76A which mate precisely with the chamber's inner surface, and into jutting portions 77, 77A which seat on the chamber's ends, thus positively supporting the plates within the chamber's ends while preventing insertion of the plates beyond a proper distance within the chamber.

The ball 67, which lies within the chamber 66 between the two end plates 68, 68A, is preferably made of a relatively heavy material, such as steel, and is closely machined to a uniform spherical shape whose diameter is slightly smaller than the chamber's inside diameter. As very little play exists between the ball 67 and the wall of the chamber 66, the ball 67 can have substantially no fore-and-aft motion within the chamber 66; however, the chamber's length being such that a small but appreciable space exists between the ball and the end plates 68, 68A, the ball 67 is free to move between the plates along the longitudinal axis of the cylinder. In contacting either plate, the ball closes the orifice 75 or 75A of a respective plate, but will close none of the vent holes 74, 74A.

The two identical tubular end fittings 69, 69A, rigidly attached to the chamber 66 in an airtight manner by the nuts 70, 70A, hold the end plates 68, 68A firmly in position at the ends of the chamber 66. The outboard ends of the end fittings 69, 69A are provided with female threads.

The two identical T fittings 71, 71A are of a common conventional design and therefore are not described in detail. The center arms of these fittings are threaded into the outboard ends of the chamber end fittings 69, 69A, the forward arms are connected to the tubes 61, 61A leading from the plenum chamber, and the aft arms are connected to the tubes 64, 64A leading to the actuators 20, 20A. The inboard end of the T fitting 71 passes through an opening in the forward end of the roll-sensitive unit support bracket 78, and the inboard end of the T fitting 71A similarly passes through the support bracket 78A. A nut 72 or 72A on each T fitting, when tightened, forces the roll-sensitive unit mounting brackets 78, 78A against the outboard ends of the chamber end fittings 69, 69A, thus firmly attaching the roll-sensitive unit in its mounting means.

Compressed between the forward end of each T fitting 71 or 71A and the aft end of its attached tube 61 or 61A is an upstream restrictor 79 or 79A pierced at its center by an opening 80 or 80A, the respective openings being of the same size, which size is smaller than that of the end plate orifices 75, 75A. A downstream restrictor 81 or 81A is similarly located at the aft end of each T fitting. An opening 82 or 82A is pierced through the center of each of these restrictors. The opening 82, 82A are of equal size and are smaller than the upstream restrictor openings 80, 80A. The upstream restrictors meter ram air into the two T fittings and, when the orifices 75, 75A are unobstructed, somewht impede flow of air into the T fittings 71, 71A, thus causing a pressure differential to exist between air in the tubes 61, 61A and the two T fittings, the T fittings' air pressure being the lower. When the ball obstructs or closes an orifice 75 or 75A, the adjacent T fitting is no longer so freely vented through that orifice to the vent holes 74 or 74A, and air pressure within the T rises toward that of the tube 61 or 61A supplying ram air to the T. The upstream restrictors thus limit ram-air flow into the T fittings 71, 71A and make possible ready control of air pressure within the two T's by the ball. The function of the downstream restrictors 81, 81A is discussed in a later paragraph.

The two tubes 61, 61A are substantially identical in diameter, length, and shape, and are symmetrically attached to the plenum chamber. As mentioned above, the upstream restrictors' opening 80, 80A are of one equal size, while the orifices 75, 75A are of another equal size and are larger than the openings 80, 80A. Each row of vent holes 74 or 74A is larger in the sum of the areas of its holes than is the corresponding orifice 75 or 75A, while the total area of the holes 74 is equal to that of the holes 74A. Consequently, with the ball located at a point midway between and thus obstructing neither orifice 75 or 75A more than the other, ram air flows through the two tubes 61, 61A into the two T fittings 71, 71A in equal volumes and pressures. Bled from the T fittings through the end fittings 69, 69A, the air passes at equal velocity through the two orifices 75, 75A, issuing into the chamber in the form of two collinear jets whose cross-sectional areas at points of issue are equal. The two jets, which are precisely directed in opposition to each other along the same line, which line passes through the centerpoint of the ball 67, impinge upon the ball 67 at diametrically opposite points, and thus impose equal and opposite forces on the ball. The ram air finally escapes from the chamber through the vent holes, 74, 74A. With the airframe in coordinated flight, no gravitational or centrifugal forces urge the ball toward either end plate, the sensing unit being rigidly mounted within the airframe; and as the forces exerted by the air jets on the ball 67 are equal and opposite, the ball 67 remains in equilibrium midway between the two chamber end plates 68, 68A.

Under the conditions enumerated in the paragraph immediately above, some ram air pressure is also transmitted from the two T fittings 71, 71A through the two downstream restrictor openings 82, 82A and the two tubes 64, 64A into the two actuators 20, 20A. Air cannot depart from either actuator, each of which is airtight, except by returning to the T fittings 71 or 71A through the respective downstream restrictor openings 82, 82A. Consequently, air flows into the actuators until air pressure in the two T fittings 71, 71A is equal to air pressure in the two actuators 20, 20A, whereupon air ceases to flow through the downstream restrictor openings, and all ram air flow passes from the T fittings into the chamber 66, thence out the chamber vent holes 74, 74A. Having the same internal pressure, the two actuators 20, 20A stand in an equilibrium with each other wherein, as previously described, the net turning moment imposed by the two actuators upon the lever 24 to which they are connected is zero. The actuators thus exert no forces tending to move the ailerons in any direction, and the ailerons are held by aerodynamic forces in their neutral position.

There thus being no torque imposed by the ailerons upon the airframe, the aircraft continues in wings-level flight.

When out-of-trim rolling forces which, for example, may be produced by gusts, cause the aircraft to roll to the left on its longitudinal axis, the sensing unit 19 is tilted with the airframe to the left, and gravitational force tends to roll the ball 67 toward the left-hand end plate 68, the force urging the ball 67 toward the end plate 68 being, up to 90 degrees of bank, proportional to the degree of bank of the airframe. This force is aided by the force imparted to the ball 67 by impact of the air jet issuing from the right-hand end plate's orifice 75A, and is opposed by forces exerted by the air jet issuing through the left-hand end plate's orifice 75.

Depending upon airspeed, a factor determining pressure of ram air supplied to the T fittings 71, 71A, and also depending upon degree of bank, the ball 67 may conceivably come to rest against the left-hand end plate 68, in which position it may completely stop the flow of ram air through the orifice 75. However, the left-hand jet becomes shorter and therefore exerts increased force on the ball as the ball approaches the left-hand end plate, while the right-hand jet becomes longer and therefore exerts less force on the ball. Also, since when ram air is bled from the T fitting 71 through the orifice 75 the pressure upstream of the restrictor 79 is greater than pressure in the T fitting 71, complete or partial obstruction of that orifice by the ball results in a prompt initial increase of air pressure in the T fitting 71. Also, partial or complete blockage of the orifice 75 by the ball 67 results in a partial or complete shutting off of the flow of ram air bled from the T fitting 71, and ram air entering that T fitting through the upstream restrictor 79 produces a prompt initial increase in air pressure within the T fitting 71, thus increasing the air pressure exerted on the ball 67 through the orifice 75. As this increase of air pressure within the T fitting 71 results in a metered flow of ram air to the left-hand actuator 20 through the downstream restrictor 81, the increase in pressure continues until sufficient ram air has passed into the left-hand actuator 20 to equalize the air pressure therein with that in the T fitting 71, with the result that air pressure exerted on the ball 67 through the orifice 75 is correspondingly increased. For these reasons, the ball generally comes to rest in a position wherein it to a certain degree restricts, but does not totally stop, the flow of ram air bled through the orifice 75, the resistance offered by the ball to the flow of air and the amount the air pressure is raised in the T fitting 71 being both proportional to the amount of deviation from coordinated flight.

As the movement of the ball 67 toward the left-hand end plate 68 in no way increases resistance offered to the flow of air bled through the right-hand end plate's orifice 75A and out of the chamber through the vent holes 74A, there is no rise in air pressure in the right-hand T-fitting 71A and bellows 20A. A pressure differential proportional to amount of deviation from coordinated flight thus exists between the left-hand actuator 20 and right-hand actuator 20A, the left-hand actuator's pressure being the higher. The left-hand actuator 20 therefore expands, deflecting the ailerons as previously described, until the right-hand actuator 20A is fully collapsed, or, more generally, until the left-hand actuator's expansive force comes into equilibrium with reversing forces transmitted from the ailerons acting in conjunction with such expansive force as is exerted by the right-hand actuator 20A.

As already explained, expansion of the left-hand actuator 20 results in deflection of the ailerons in a manner imposing a right-hand rolling force on the fuselage. This force halts the roll to the left, and initiates a reverse roll which returns the airframe to a zero-bank attitude. During this return to wings-level flight, the degree of bank is progressively lessened, and gravitational forces tending to move the ball toward the left-hand end plate decrease in proportion to the progressive decrease in tilt-angle of the sensing unit 19. The higher air pressure exerted on the ball through the left-hand end plate's orifice 75 forces the ball away from that orifice a distance proportional to decrease of the opposing gravitational force, thus also proportionally lowering air pressure in the left-hand T fitting, and allowing air to flow from the left-hand actuator through the downstream restrictor 81, tube 64, T fitting 71, left-hand end plate orifice 75 and chamber vent holes 74, resulting in collapse of the actuator in an amount proportional to decrease of bank angle. As the aircraft reaches a wings-level attitude, the ball again reaches a position lying midway between the two end plates 68, 68A, and aerodynamic forces complete a return of the two ailerons, and hence the two actuators, to their neutral position wherein the ailerons exert no rolling forces on the airframe.

The downstream restrictors 81, 81A offer a resistance to flow of air into or out of the respective actuators 20, 20A, and thus tend to limit the rate of such airflow. Also, the downstream restrictors, by thus limiting rate of airflow into the actuators, serve the useful function of providing increases in air pressure within the T fittings 71, 71A in anticipation of such increases within the actuators 20, 20A, thus raising air pressures exerted on the ball and tending to limit the extent to which the ball 67 may, by shutting off the flow of ram air bled through a particular orifice 75 or 75A, raise the air pressure in a particular T fitting 71 or 71A. Thus, the downstream restrictors are instrumental in controlling the expanding and collapsing rates of the actuators 20, 20A, and consequently regulate the rate of response on the part of the flight-stabilization system to deviations from coordinated flight. As a result, too-rapid deflections of the ailerons, which might result in the sudden application of excessive structural loads on the airframe, as well as abrupt, jerky, rolling motions of the airframe, are avoided.

In theory, the ball 67 stands still in equilibrium, as described above, at a point equidistant between the two end plates 68, 68A when the aircraft is in wings-level straight flight, and at other points, the location of which are dependent upon specific conditions of flight, during correctly banked turns. Experience has shown, however, that the ball actually undergoes a rapid small-amplitude oscillation about its theoretical point of equilibrium, which oscillation is thought to be caused by the independent or combined actions of turbulence arising within the air in the chamber 66, periodic fluctuation of pressure in the ram air bled into the chamber, and minute dimensional imperfections in the ball and/or chamber. The oscillation is advantageous in that, eliminating conceivable tendencies of the ball to stick in "dead" spots, it keeps the ball ready and prompt in response to any changes in the several position-determining forces which may be imposed upon the ball.

An out-of-trim roll to the right produces movement of the ball 67 toward the right-hand end plate 68A, increase of air pressure in the right-hand T fitting 71A, tube 63A, and actuator 20A, expansion of that bellows, and consequent deflection of the ailerons in a manner which causes aerodynamic forces, imposed upon the ailerons 16, 16A and transmitted through the horizontal tail surfaces into the fuselage, to reverse the direction of roll and thus return the aircraft to a wing-level, coordinated flight attitude. As in recovery from a roll to the left, the ball, actuators, and ailerons 16, 16A return to their respective neutral positions simultaneously with return of the aircraft to wings-level flight at the end of recovery from a right-hand roll, which positions are maintained until out-of-trim rolling moments again have rolled the aircraft to left or right from a coodinated straight-flight attitude.

In turns to either the right or left, the roll-stabilizing system causes the towed target to fly at an angle of bank appropriate to the rate of turn. With reference to Fig. 5 and assuming a turn to the left by the towing airplane wherein the target is towed in turning flight to the left, centrifugal force moves the ball 67 toward the right-hand orifice 75A, thus impeding in a particular degree the flow of ram air bled through that orifice, resulting in an increase in air pressure in the right-hand T fitting 71A, tube 64A, and actuator 20A, expansion of the right-hand actuator 20A, and deflection of the ailerons 16, 16A in a manner causing the aircraft to roll to the left. As the aircraft banks to the left, gravitational forces tending to move the ball away from the right-hand orifice 75A are imposed on the ball, so that the ball is moved away from that orifice, more ram air bleeds through the orifice, and air pressure to the left-hand actuator 20 is accordingly lessened. At a particular constant rate of turn, equilibrium of forces acting on the ball is reached when the airframe is so positioned that the sum of centrifugal and gravitational forces tending to move the ball to the right or left becomes zero; or, otherwise stated, when the resultant of those forces becomes perpendicular to the longitudinal axis of the chamber. In this position, the aircraft is in perfectly coordinated turning flight. If the rate of turn to the left increases or decreases, this equilibrium of forces acting on the ball is disturbed by the corresponding increase or decrease in the centifugal force imposed on the ball, which accordingly moves, as the case may be, nearer to or farther from the right-hand end plate's orifice, thus effecting pressure changes in the actuators that result in a rolling of the aircraft to the degree of bank proper to the particular, newly-established rate of turn. In the event that the rate of turn is reduced to zero, that is, if the aircraft resumes straightaway flight, the degree of bank is reduced to zero, as is appropriate to that flight condition.

If an out-of-trim rolling moment alters the perfectly banked attitude of the turning aircraft, the flight-stabilization system responds by repositioning the ailerons in a manner which returns the aircraft to a degree of bank proper to the particular turn. In response to too great an angle of bank to the left, the ball 67 is moved by gravitational force toward the left-hand end plate 68, thus causing expansion of the left-hand actuator 20 and a reverse roll of the air-frame to a proper degree of bank. Similarly, the ball is moved by centrifugal force toward the right-hand end plate 68A when, in a left-hand turn, angle of bank to the left is insufficient; and the consequent expansion of the right-hand actuator 20A results in aileron deflections which roll the aircraft to the left into a coordinated flight-attitude.

Bearing in mind that the directions of gravitational and centrifugal forces urging the ball 67 to right or left during turning flight of the aircraft to the right are opposite to those described above in connection with turning flight to the left, the operation of the flight-stabilization system and its effects on flight-attitude of the aircraft during such turns is fully and readily understandable with reference to the above description of operation of the system during left-hand turns, and accordingly is not herein described.

It will be apparent to those skilled in the art, after understanding the present invention, that the dimensions of the components of the roll-stabilization system may be varied, within the teaching of the invention. It will also be apparent that the present invention may be used for control of wing-mounted ailerons on aircraft having conventional, fixed, wing-surfaces, or may be used in guided missiles and other pilotless aircraft, or may even be used in still other vehicles or machines in which control of equilibrium is desirable.

While only one embodiment of the invention has been shown in the accompanying drawings, it will be evident that various modifications are possible in the arrangement and construction of the flight-stabilizing system components without departing from the scope of the invention.

We claim:

1. In combination with an aircraft having control surfaces for control of rolling motions of the aircraft about its longitudinal axis, a flight-stabilizing mechanism mounted in the aircraft comprising: a power means utilizing compressed air from an air source as its primary source of energy; a connecting means including a mechanical linkage operably connecting said power means to said control surfaces; a sensing means including a chamber communicatingly connected to said power means and including a spherical body movably contained within said chamber, said spherical body being sensitive and responsive to deviations of the aircraft from coordinated flight for controlling, in cooperation with said chamber, energization of said power means, said spherical body further being free-moving and restrained only by walls of said chamber and by airflow within said chamber; and an energizing compressed air supplying means communicating with and supplying compressed air to the chamber of said sensing means, whereby said sensing means allocates compressed air to said power means to energize the latter for deflecting said control surfaces for counteraction of said deviations from coordinated flight.

2. In combination with an aircraft having control surfaces for control of rolling motions of the aircraft about its longitudinal axis, a flight-stabilizing mechanism mounted in the aircraft comprising: a power means utilizing compressed air as its primary source of energy; a connecting means operably connecting said power means to said control surfaces; a sensing means including a cylindrical chamber communicating with said power means and having a spherical body movably contained and axially movable within said cylindrical chamber, said spherical body being sensitive and responsive to deviations of the aircraft from coordinated flight for controlling, in cooperation with said cylindrical chamber, energization of said power means, said spherical body further being free-moving and restrained only by walls of said chamber and by airflow within said chamber; and an air scoop communicating with the chamber of said sensing means and adapted to conduct ram air from outside the aircraft to said chamber of said sensing means, whereby said sensing means controls energization of said power means by said air scoop to deflect said control surfaces for counteraction of said deviations from coordinated flight.

3. Flight-stabilizing mechanism for an aircraft having control surfaces comprising: power means in said aircraft including a pair of pneumatically operated actuators; a scoop on said aircraft having a communicating connection with said actuators to conduct ram air thereto; and a valve chamber positioned transversely of said aircraft and having ports communicating with said communicating connections of said scoop with said actuators for governing the flow of air to said actuators; roll and turn sensing means comprising a spherical ball positioned in said valve chamber, said ball being adapted by centrifugal and gravitational forces imposed upon said ball for directly restricting one of said ports when said aircraft deviates from coordinated flight; and linkage means between said actuators and said control surfaces adapted to differentially deflect said surfaces from their neutral position in proportion to the restriction of one of said ports of said valve chamber by said ball, whereby a stabilizing force is imposed on said aircraft in opposition to its deviation from coordinated flight.

4. Flight-stabilizing mechanism for an aircraft having a pair of control surfaces comprising: pneumatic power means in said aircraft, including a pair of actuators; an operable connection between each of said actuators and each of said control surfaces; means for governing said power means including a chamber positioned transversely of the longitudinal axis of said aircraft, and containing a spherical member freely movable therein and restrained only by walls of said chamber and by airflow within said chamber; an opening in said aircraft for admitting external air and having a communication with said chamber; and a pair of openings from said chamber communicating with said power means, one of said openings communicating with one of said actuators and the other of said openings communicating with the other of said actuators, said pair of openings being adapted to be directly restricted by said spherical member when said aircraft deviates from its coordinated flight attitude whereby said power means is energized by said external air to deflect said control surfaces proportionately to and in opposition to said deviation of said aircraft from its coordinated flight attitude.

5. In combination with an aircraft, an actuating mechanism sensitivity responsive to uncoordinated flight of said aircraft comprising: power means including a pair of pneumatically operated actuators in said aircraft; energizing means including a compressed air supply in the aircraft having a connection providing direct communication with each of said pneumatic actuators for conducting compressed air thereto; a bleed means communicating with each of said communicating connections of said compressed air supply with the pneumatic actuators, including a bleed chamber mounted transversely of said aircraft and having intermediate its two ends a pair of openings through its wall, said two openings lying on opposite sides of the lengthwise middle of said bleed chamber, said chamber further having an orifice in each of its ends, a first tubular member communicatingly connecting the orifice in one end of said bleed chamber with said communicating connection of said compressed air supply with one of said actuators for bleeding compressed air therefrom and thereby preventing energization of said one of said actuators, and a second tubular member communicatingly connecting the orifice in another end of said bleed chamber with said communicating connection of said compressed air supply with the other of said actuators for bleeding compressed air therefrom and thereby preventing energization of said other of said actuators; sensing means comprising a spherical body movable within said chamber along the longitudinal axis thereof between said orifices of said tubular members, said sensing means being subjected on its one end to pressure of bled-off ram air entering said chamber through the orifice in one of its ends, and on its opposite side to the pressure of ram air similarly entering said chamber through the orifice in its other end, said sensing means further being movable in response to centrifugal and gravitational forces attendant upon uncoordinated flight of the aircraft and operative for selectively and directly obstructing said orifices in said ends of said chamber of said bleed means, thereby effecting selective energization of the two actuators of said power means in response to said uncoordinated flight of said aircraft.

References Cited in the file of this patent

UNITED STATES PATENTS

| | | |
|---|---|---|
| 1,049,713 | Hensel | Jan. 7, 1913 |
| 1,224,357 | Bullington | May 1, 1917 |
| 1,430,374 | Hensel | Sept. 26, 1922 |
| 2,559,817 | Ashkenas | July 10, 1951 |